(12) United States Patent  (10) Patent No.: US 6,411,742 B1
Peterson  (45) Date of Patent: Jun. 25, 2002

(54) MERGING IMAGES TO FORM A PANORAMIC IMAGE

(75) Inventor: John Peterson, Menlo Park, CA (US)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 09/572,050

(22) Filed: May 16, 2000

(51) Int. Cl.$^7$ .................................................. G06K 9/36
(52) U.S. Cl. ...................... 382/284; 382/287; 358/450; 345/629; 345/630; 348/584; 348/588
(58) Field of Search ................................ 382/284, 283, 382/282, 294, 287, 236, 293, 291, 278; 345/629, 630, 635, 637, 638; 348/588, 584, 598, 36, 47; 358/450, 452

(56) References Cited

U.S. PATENT DOCUMENTS 5,185,808 A * 2/1993 Cok .......................... 382/284
5,920,657 A * 7/1999 Bender et al. ............. 382/284
6,005,545 A * 12/1999 Nishida et al. ............. 345/150
6,075,905 A * 6/2000 Herman et al. ............. 382/284

OTHER PUBLICATIONS

A Multiresolution Spline With Application to Image Mosaics, ACM Transactions on Graphics, vol. 2, No. 4, Oct. 1983, pp. 217–236.
Compositing Digital Images, Computer Graphics, vol. 18, No. 3, Jul. 1984, pp. 253–259.
Pyramidal Parametrics, Computer Graphics, vol. 17, No. 3, Jul. 1983, pp. 1–11.

* cited by examiner

Primary Examiner—Bhavesh Mehta
Assistant Examiner—Yosef Kassa
(74) Attorney, Agent, or Firm—Fish & Richardson P.C.

(57) ABSTRACT

A method of blending images of segments of a view includes determining the position of a second segment of the view represented by a second image relative to a first segment of the view represented by a first image; dividing the second image into a first section and a second section, based on the determined positions; drawing the first image on a canvas; and drawing the first section of the second image on the canvas at the determined position so that a portion of the first section masks out a portion of the first image.

18 Claims, 8 Drawing Sheets

MERGING IMAGES TO FORM A PANORAMIC IMAGE

TECHNICAL FIELD

This invention relates to merging images to form a panoramic image.

BACKGROUND

Image capture devices, such as cameras, are used to capture an image of a section of a view, such as a section of the front of a house. The section of the view whose image is captured by a camera is known as the field of view of the camera. Adjusting a lens associated with a camera may increase the field of view. However, there is a limit beyond which the field of view of the camera cannot be increased without compromising the quality, or "resolution", of the captured image. It is sometimes necessary to capture an image of a view that is larger than can be captured within the field of view of a camera. Multiple overlapping images of segments of the view are taken and then the images are joined together, or "merged," to form a composite image, known as a panoramic image.

An image captured by a camera distorts the sizes of objects depicted in the image so that distant objects appear smaller than closer objects. The size distortion, which is known as perspective distortion, depends on the camera position, the pointing angle of the camera, and so forth. Consequently, an object depicted in two different images might not have the same size in the two images, because of perspective distortion.

SUMMARY

In general, one aspect of the invention relates to a method of blending images of segments of a view. The method includes determining the position of a second segment of the view represented by a second image relative to a first segment of the view represented by a first image, dividing the second image into a first section and a second section, based on the determined positions, drawing the first image on a canvas, and drawing the first section of the second image on the canvas at the determined position so that a portion of the first section masks out a portion of the first image.

In general, another aspect of the invention relates to an article that includes a computer-readable medium, which stores computer-executable instructions for blending images of segments of a view according to the method described above.

Determining the position of the segment depicted in the second image relative to the segment in the first allows the method to blend images that may represent segments of the view that are arbitrarily positioned relative to each other. It also allows the method to blend images that may have arbitrary shapes and sizes. The method also saves processing time by drawing the first image without altering it and then masking out portions of the first image with a section of the second image.

Embodiments of the invention may include one or more of the following features. The method further includes determining a position of a third segment of the view, represented by a third image, relative to the first segment, dividing the third image into a third section and a second section, based on the determined position relative to the first segment, determining a position of the third segment of the view relative to the second image, dividing the third section into a fifth and a sixth section, based on the determined position relative to the second image, and drawing the fifth section of the third image on the canvas at the determined position relative to the third image so that a portion of the fifth section obstructs at least one of the first image and the first section of the second image. Thus the method allows a new image to be added to the blended panoramic image without performing any additional processing of the earlier images. The method only computes the section of the new image that should be drawn over the panoramic image.

The method responds to a command to remove the third image by erasing the canvas; drawing the first image on the canvas; and drawing the first section of the second image on the canvas at the determined position of the second segment relative to the first segment so that portions of the first section mask out portions of the first image. The method saves processing time by simply drawing the previously determined first section on the first image, without performing any additional computations.

Prior to dividing the second image, perspective distortion in the second image is corrected to improve the quality of the panoramic image. The second image is divided into the first and second section by a dividing line that is determined based on an outline of the first image; an outline of the second image; and the relative position of the second image segment relative to the first image segment. The dividing line joins two points of intersection of the outlines of the first and second images when the second image is positioned at the determined relative position, e.g., two most distant points of intersection. The first section of the second image is determined based on how much of the second image on each side of the dividing line is overlapped by the first image. A region around the dividing line where the second image is mixed with the first image to smooth out the transition between the first image and the second image is determined. The dividing line divides the region into a first sub-region contained within the first segment of the second image and a second sub-region contained within the second segment of the second region. More of the second image is mixed in the first sub-region than the second sub-region to provide a smoother transition between the first and second images.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
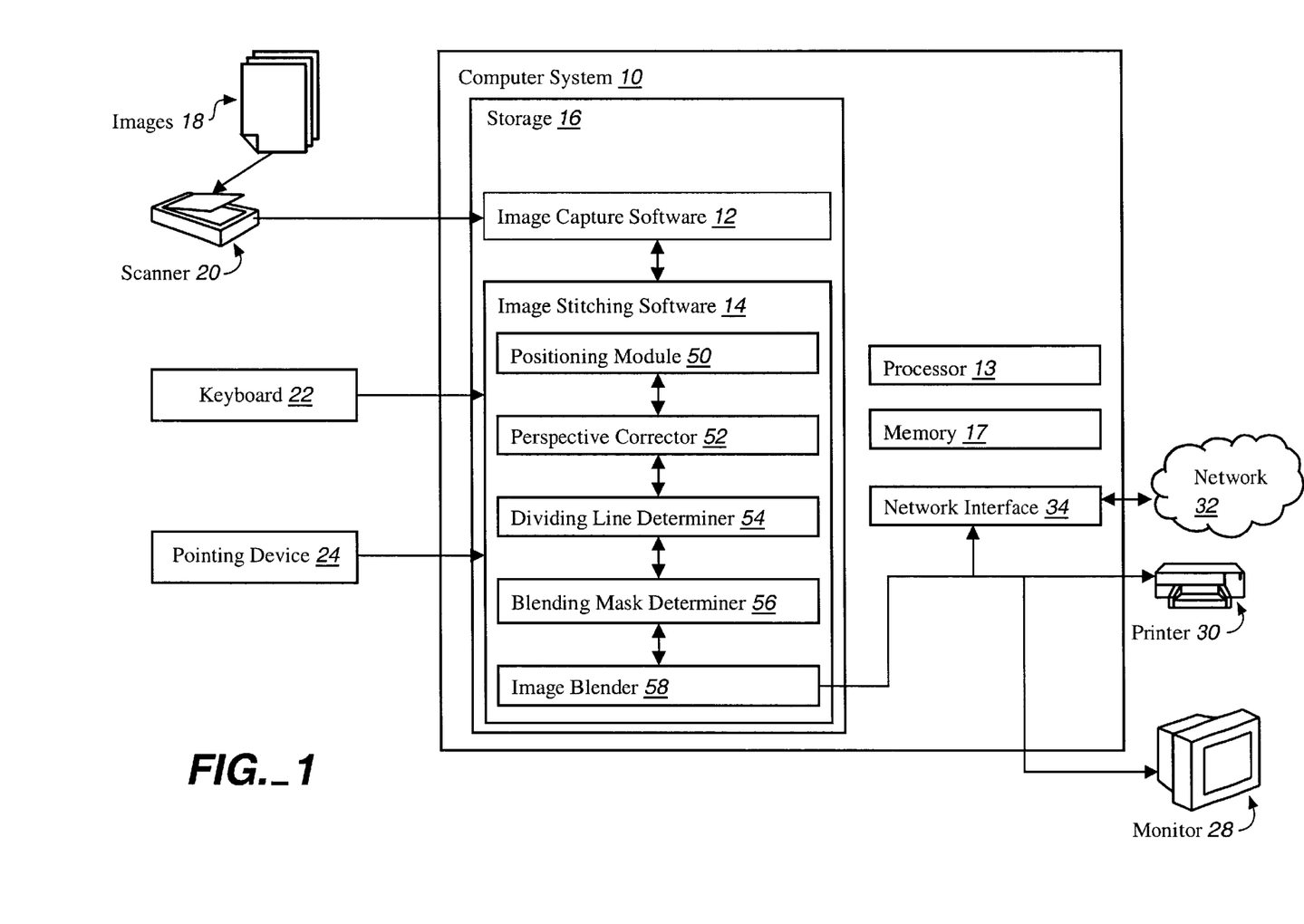
FIG. 1 is a block diagram of a system for blending images of overlapping segments of a view.

Referring to FIG. 1, a computer system 10 for blending images 18 has a processor 12 for executing programs 12, 14 stored within a storage 16. Storage 16 is a computer readable medium, such as a CDROM, a hard disk, a hard disk array, a floppy disk or a ROM. The computer programs 12, 14 (i.e., the image capture software 12 and the image stitching software 14) are loaded into computer readable memory 16 and then executed to process the images 18. The computer system 10 is associated with a scanner 20 for converting the images 18 into a digital format, a computer keyboard 22, and a pointing device 24 for capturing input from a user (not shown). The computer system 10 is also associated with a monitor 28 for displaying images, and a printer 30 for printing images. The computer system 10 also includes a network interface 34 for communicating with devices connected to a computer network 32.

The user (not shown) activates the scanner 20 using the keyboard 22 or the pointing device 24, causing the scanner to scan and transmit the images 18 to the image capture software 12. The image capture software 12 is a TWAIN application-programing interface (API) that captures the images 18 and conveys them to image stitching software 14. Image stitching software 14 blends the images 18 together to form a panoramic image 26 that is displayed on the monitor 28 or printed on the printer 30. The panoramic image 26 may also be stored within the storage 16 or transmitted to a remote location over the computer network 32 through the network interface 34.

Figure 2A:
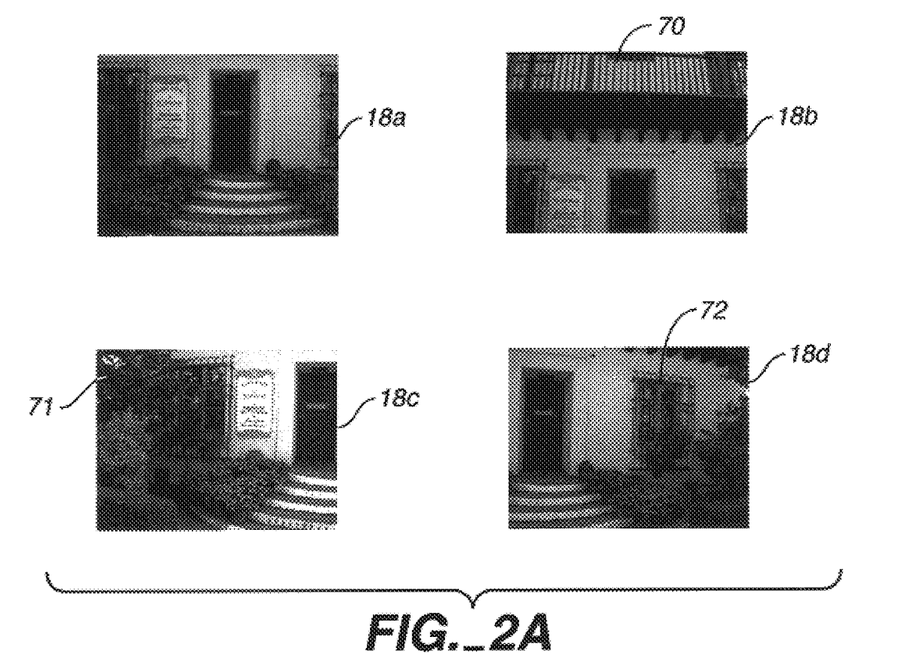
FIG. 2A shows four exemplary images of overlapping segments of a view.

Referring to FIG. 2A, images 18 depict overlapping segments of a view that are common to all the images. For example, images 18a–18d all depict segments of the front view of a house. The first image 18a depicts a central segment of the front view and is centered about the entrance to the house. The second image 18b depicts an upper segment of the view to include a balcony 70 on an upper floor of the house, while the third image 18c depicts a left segment of the front view to include a tree 71 located to the left of the entrance. The fourth image 18d depicts a right segment of the view to include the window to the right of the entrance.

Figure 2B:
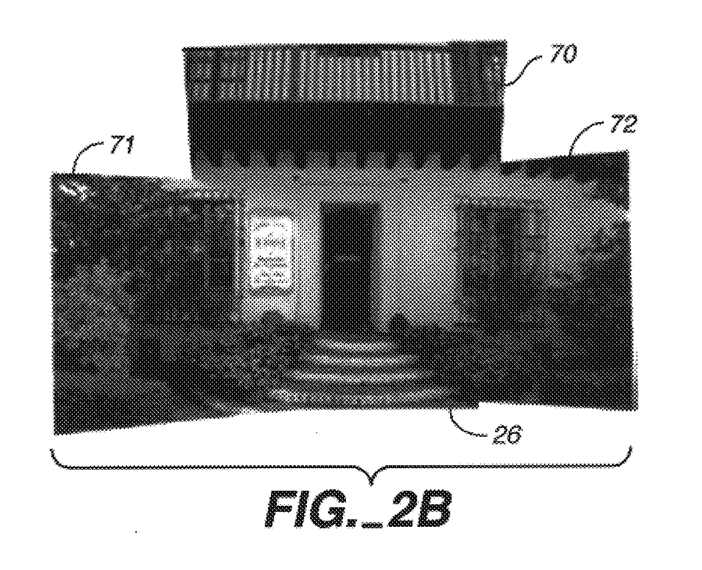
FIG. 2B is a panoramic image formed by the system of FIG. 1 by blending the images of FIG. 2A.

Referring to FIG. 2B, image stitching software 14 (FIG. 1) blends the images 18a–18d so to generate a single panoramic image 26 that includes the balcony 70, the tree 71, and the window 72. Thus, the image stitching software 14 allows a user to blend multiple images 18a–18d to create a panoramic image 26 with a field of view that is larger than the field of any one of the multiple images.

Referring again to FIG. 1, the positioning module 50 of the image stitching software 14 determines the relative positions of the segments depicted in two of the images 18a–18d so that an image of an object depicted in one of the images can be aligned with another image of the same object. The positioning module 50 automatically determines the relative positioning of the two segments corresponding to the images using known methods described in "Direct Estimation of Displacement Histograms", Proceedings of the OSA Meeting on Image Understanding and Machine Vision, June 1989, Bernd Girod & David Kuo ("Girod"), which is incorporated herein by reference. The software modules are dynamically linked, machine language libraries that are obtained by compiling a high level computer programming language, such as "C++" or "C". The functions and operations of the different software modules will be described below.

Figure 2C:
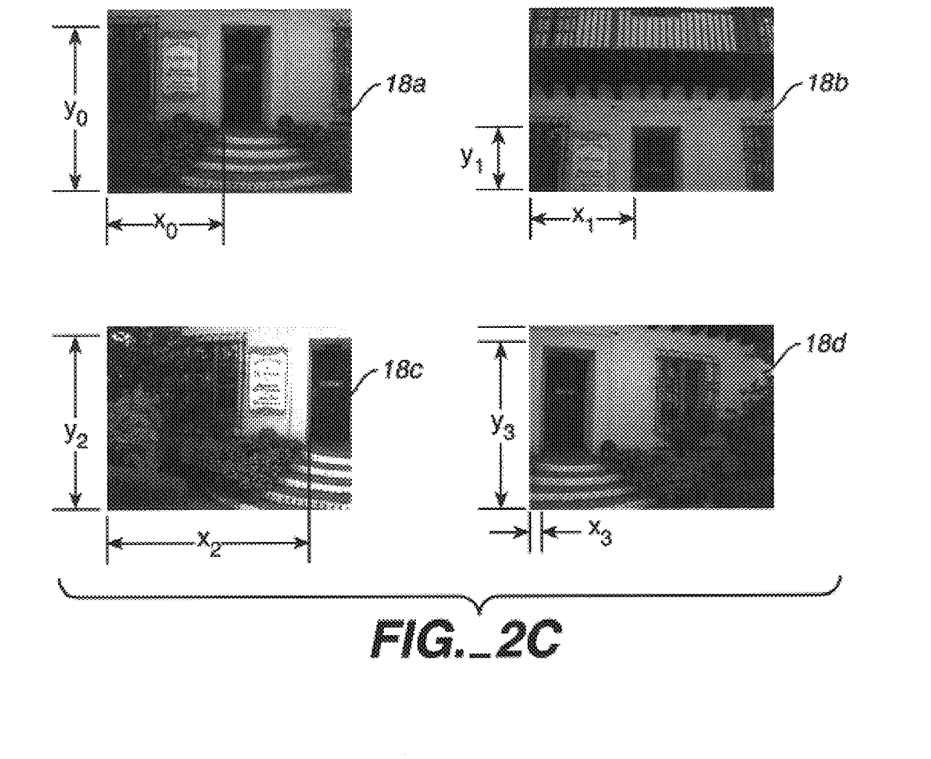
FIG. 2C shows the images of FIG. 2A along with positioning information used in blending the images.

Referring to FIG. 2C, the determination of the position of the relative segments will be described with reference to the position of the top left corner of the doorway relative to the bottom left corner of each of the images 18a–18d. For example, the top left corner of the doorway is horizontally displaced from the bottom left corner of the image by a distance $x_0$ in the first image 18a, while it is displaced by a distance $x_1$ in the second image 18a. Consequently the second image is displaced to the left of the first image by a distance ($d_{left}$) given by the mathematical equation:

$$d_{left} = x_0 - x_1.$$

Similarly, the top left corner of the doorway is vertically displaced from the bottom left corner of the image by distance $y_0$ in the first image 18a, while it is displaced by a distance $y_1$, in the second image 18a. The second image is, therefore, displaced below the first image by a distance ($d_{down}$) given by the mathematical equation:

$$d_{down} = y_0 - y_1.$$

Figure 2D:
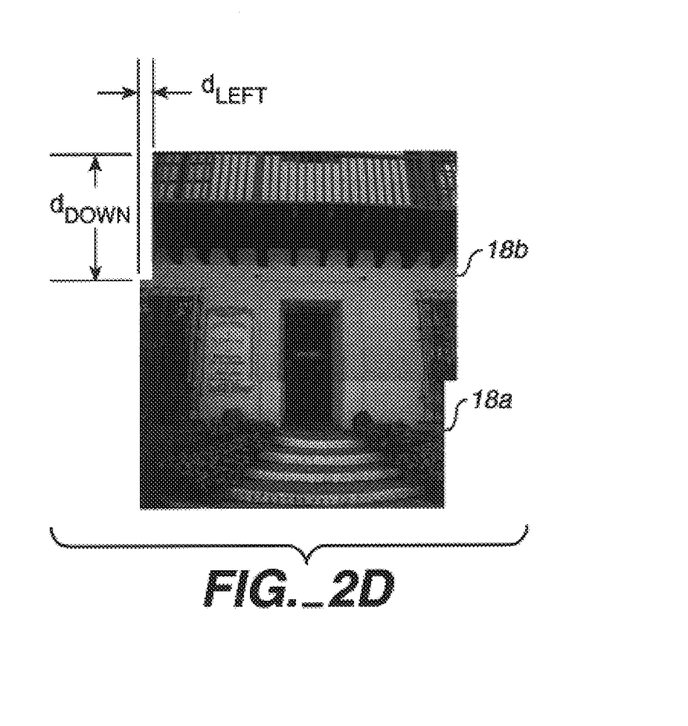
FIGS. 2D and 2E show the images of FIG. 2A after they have been aligned using positioning information.

To align the top left corner of the doorway in the first image 18a and the second image 18b, the two images are overlapped and the second image is displaced by the distance $d_{left}$ to the right and displaced by the distance $d_{down}$ upwards, as shown in FIG. 2D. The other images 18c and 18d are also overlapped and displaced in a similar fashion to align the pixel representing the top left corner of the doorway in one image to other pixels representing the same corner of the doorway in other images. The result of aligning all the images 18a–18d is shown in FIG. 2E.

Figure 2E:
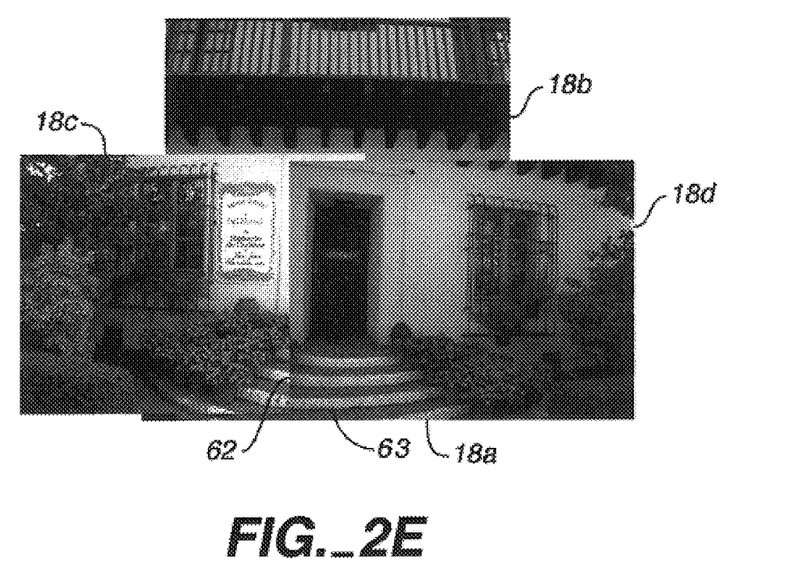

However, as shown in FIG. 2E, the overlapping images resulting from the positional alignment described above may not seamlessly blend into each other. For example, a seam 62 is created across a staircase 63 (depicted in the overlapped images) where the two images 18c and 18d join each other. Consequently, additional processing is required to blend the images into each other and create the near-seamless panoramic image 26 (FIG. 2B). The perspective corrector 52 and the other modules 54–58 perform the additional steps, as described below.

Figure 2F:
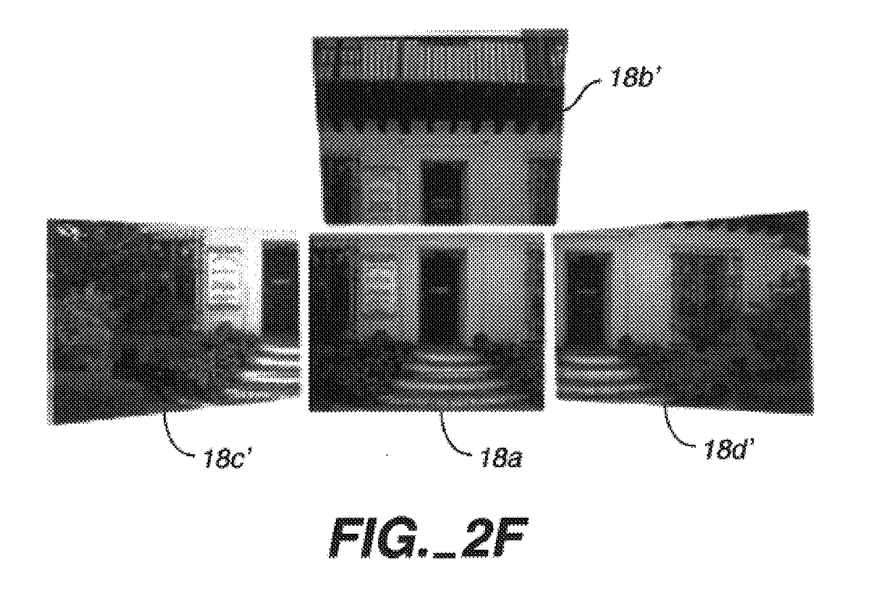
FIG. 2F shows the images of FIG. 2A after the system of FIG. 1 has corrected them for perspective distortion.

To reduce seams 62 (FIG. 2E) in the blended image, the perspective corrector 52 corrects perspective distortions within the images using known methods described in "Virtual Bellows", "Proceedings of IEEE International Conference on Image Processing, November 1994, Steven Mann & R. W. Picard"), which is incorporated herein by reference. The perspective of each of the original images 18b–18d (FIG. 2A) is corrected relative to the first image 18a by either enlarging one side of the images 18b–18d corresponding to more distant objects and/or shrinking another side of the images 18b–18d corresponding to closer objects. The perspective correction yields trapezoidal second 18b', third 18c', and fourth images 18d' (shown in FIG. 2F). Aligning the trapezoidal images results in smaller seams 62 (FIG. 2E) because the objects in the images do not have distorted sizes.

Figure 3A:
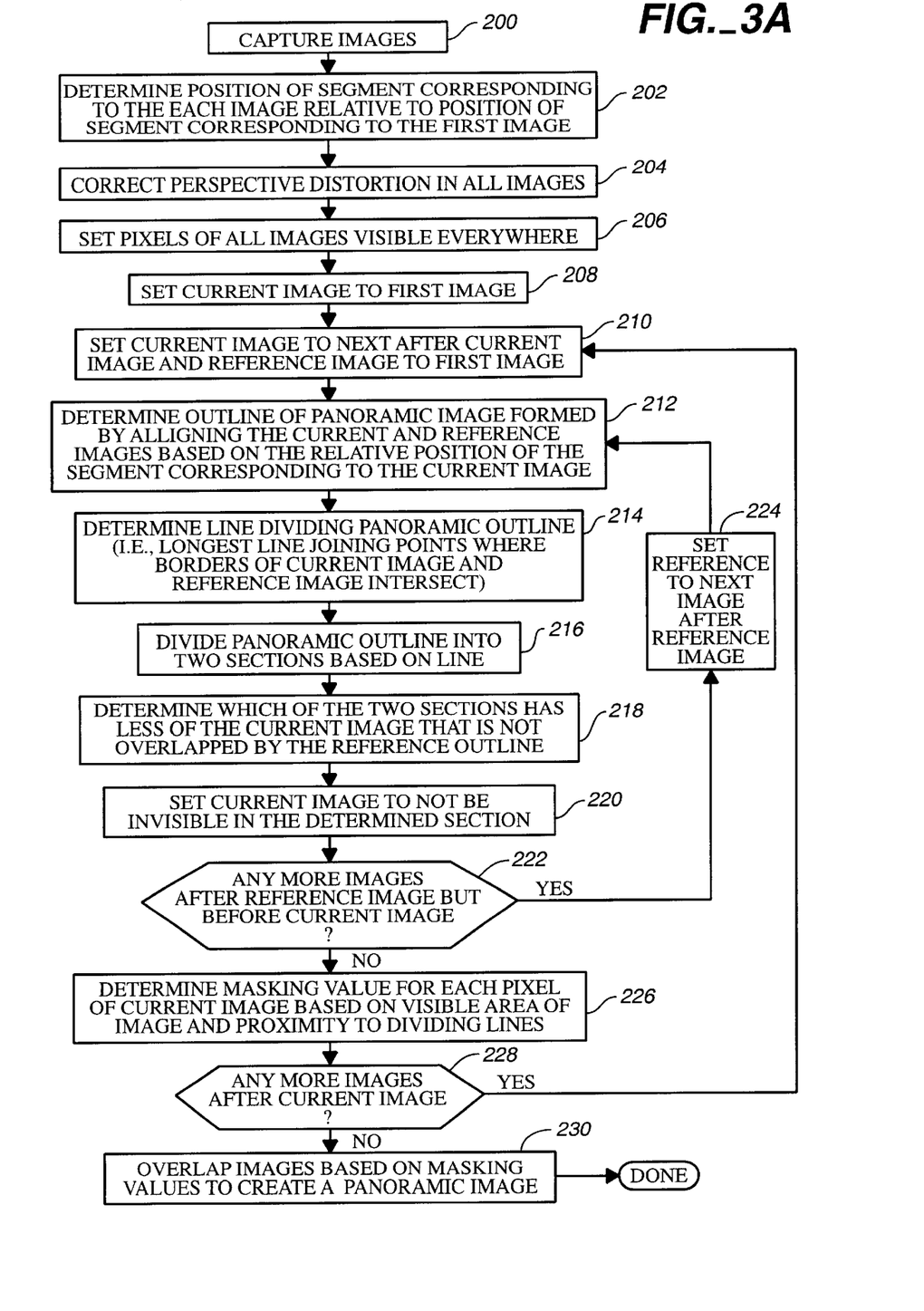
FIG. 3A shows the process used by the system of FIG. 1 to blend images.
Figure 3B:
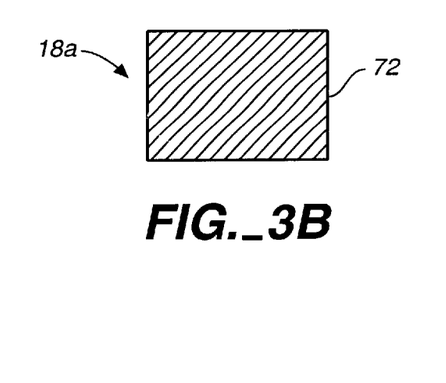
FIGS. 3B and 3C show various image outlines used to blend the images of FIG. 2F.
Figure 3C:
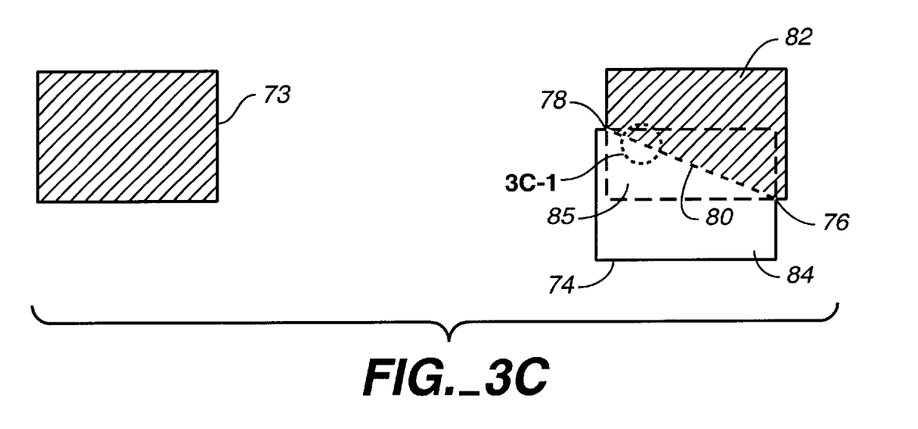
Figure 3C:
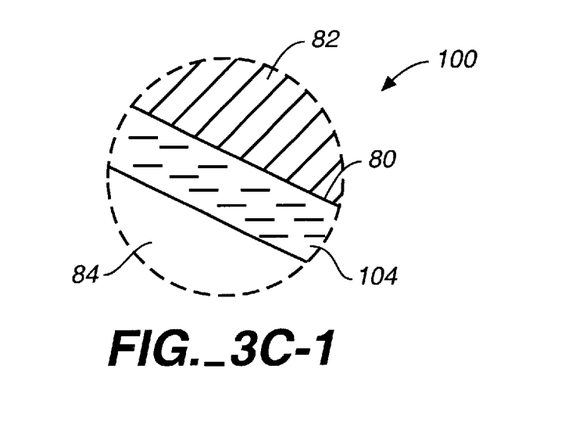
FIG. 3D is a plot of mask valued used in blending the images of FIG. 2F.
FIG. 3E shows various image outlines used to blend an image of FIG. 2F.

Referring to FIGS. 3A–3C, a process for blending images implemented by the computer system of FIG. 1 will be described using the images 18a–18d as examples. The process begins when the image capture software 12 (FIG. 1) captures (200) the images 18 (FIG. 1) that are to be blended. The positioning module 50 (FIG. 1) determines (202) the position of the segment of the view corresponding to the each image 18b–18d relative to the segment of the view corresponding to the first image 18a (as previously described with reference to FIGS. 2C and 2D), and the perspective corrector 52 corrects (204) perspective distortion in each image 18b–18d relative to the reference image 18a (as previously described with reference to FIG. 2F). The stitching software 14 (FIG. 1) then sets (206) a visible property of the pixels of all the images to indicate that all the pixels of all the images start of being visible. The stitching software then sets (208) the current image to be the first image and proceeds to determine the visible area of each of the images 18a, 18b'–18d' as described below.

The stitching software 14 sets (210) the current image to be the next image 18b' after the current image 18a and sets the reference image to be the first image 18a. Thereby leaving all the pixels 72 of the first image 18a visible (indicated by hash marks in FIG. 3B). Although all the pixels of the first image are set visible, some of the pixels of the first image may be obstructed or masked out by visible portions of subsequent images, as described later.

The dividing-line determiner 54 (FIG. 1) determines (212) an outline 74 (FIG. 3C) of a panoramic image formed by aligning the current image 18b' and the reference image 18a (as previously described with reference to FIG. 2D). The dividing-line determiner 54 also determines a pair of points 76, 78 where the outlines of the aligned images intersect, thereby defining (214) a line 80 that divides (216) the panoramic outline 74 into two sections 82, 84 (216). If the outlines of the aligned images intersect at more than two points, the dividing-line determiner 54 selects the two intersection points that are furthest apart from each other to define the dividing line 80. The dividing-line determiner 54 then determines (218) which one of the two sections 82, 84 has less of the current image 18b' that is not overlapped by the reference image 18a and sets (220) that section of the current image to be invisible. In the example of FIG. 3C, the section is 84 has none of the current image profile 73 that is not overlapped by the first image 18a. Consequently, the portions of the image profile 85 contained within the section 84 are set invisible, leaving the hashed section 82 of the image 18b visible.

The stitching software 14 checks (222) whether there are any more images between the reference image 18a and the current image 18b'. If there are more images, the stitching software 14 sets (224) the reference image to be the next image after the current reference image and repeats the process of setting a section of the current image 18b' invisible 208–220 described above. Otherwise if there are no more images, the blending mask determiner 56 (FIG. 1) determines (226) the pixels within the current image that will mask out pixels of earlier images. Only visible pixels 82 of the current image 18b' mask out pixels of earlier images. Consequently, the mask value of pixels contained within the region 82 is set to "1", while the mask property of pixels contained within the region 84 is set to "0".

The blending mask determiner smoothes the intersection between the region 82 with pixel values set to 1 and the region 84 with pixel values set to 0 by applying a method described in "A Multiresolution Spline With Application to Image Mosaics", ACM Transactions on Graphics, Vol 2, No. 4, October 1983, P. J. Burt & E. H. Adelson, which is incorporated herein by reference. Referring to the close-up 100 of FIG. 3C, the smoothing establishes a transition band 104 within the invisible section 84 and next to the dividing line 80 where the mask value transitions smoothly from a value of "1" at the dividing line to a value of "0", thereby eliminating sharp discontinuities in the panoramic images at the dividing line 80 where blended images 18a, 18b' intersect, as will be described later.

Figure 3D:
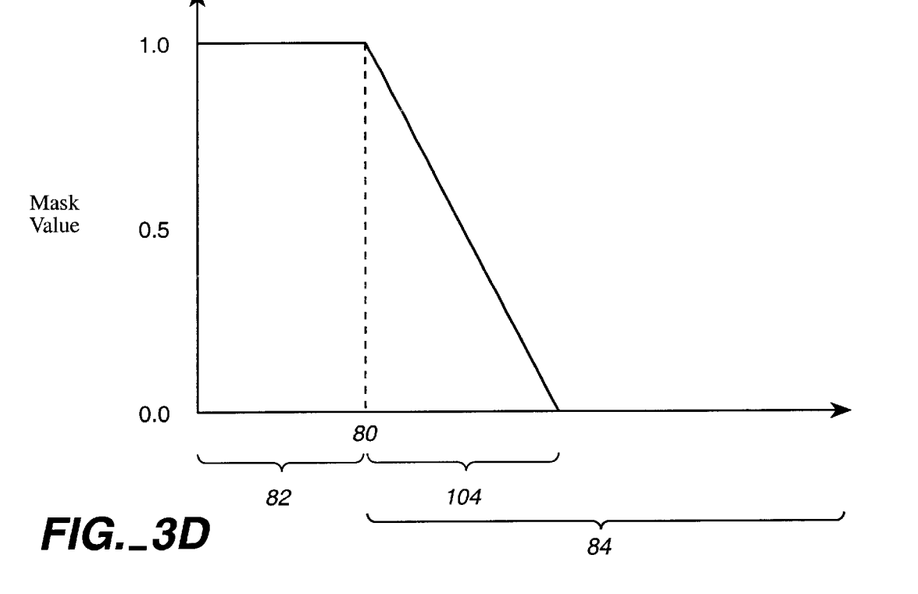

As shown in FIG. 3D, the mask value is "1" within the visible region 82. The smoothing function causes the mask value to reduce smoothly within the transition band 104 to a value of "0" within the invisible region 84.

Referring again to FIG. 3A, after determining the mask values of the image, the stitching software 14 checks (228) whether there are any images after the current images. If there are more images, the stitching software sets (210) a new current image to be the next image after the current image and proceeds to determine the mask values of the new current image (212–226).

Figure 3E:
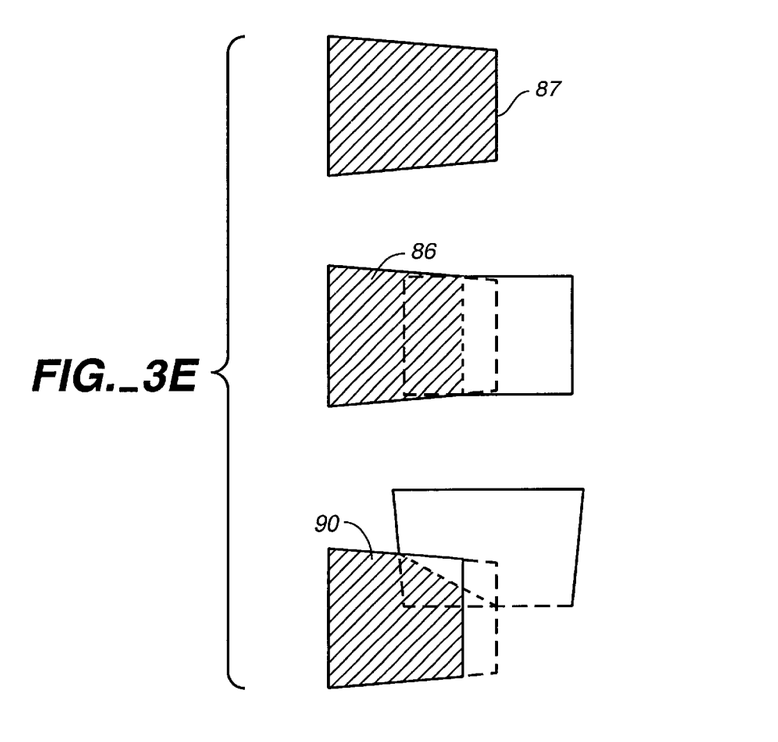

Based on the discussion above, the processing of subsequent images 18c' and 18d' can be inferred. For example, referring to FIG. 3E, it will be appreciated that the visible area of the third image 18c' will be set to the interior of an outline 87 at 206, and that when the reference image is the first image 18a, the visible area will be reduced at 220 to the interior of a smaller outline 86. Subsequent to that, when the reference image is set to the second image 18b' the visible area will be further reduced to an even smaller outline 90.

Referring again to FIG. 3A, if there are no more images after the current image, the image blender 58 overlaps the images 18a, 18b'–18d' based on the masking value to create the panoramic image (230).

Figure 4:
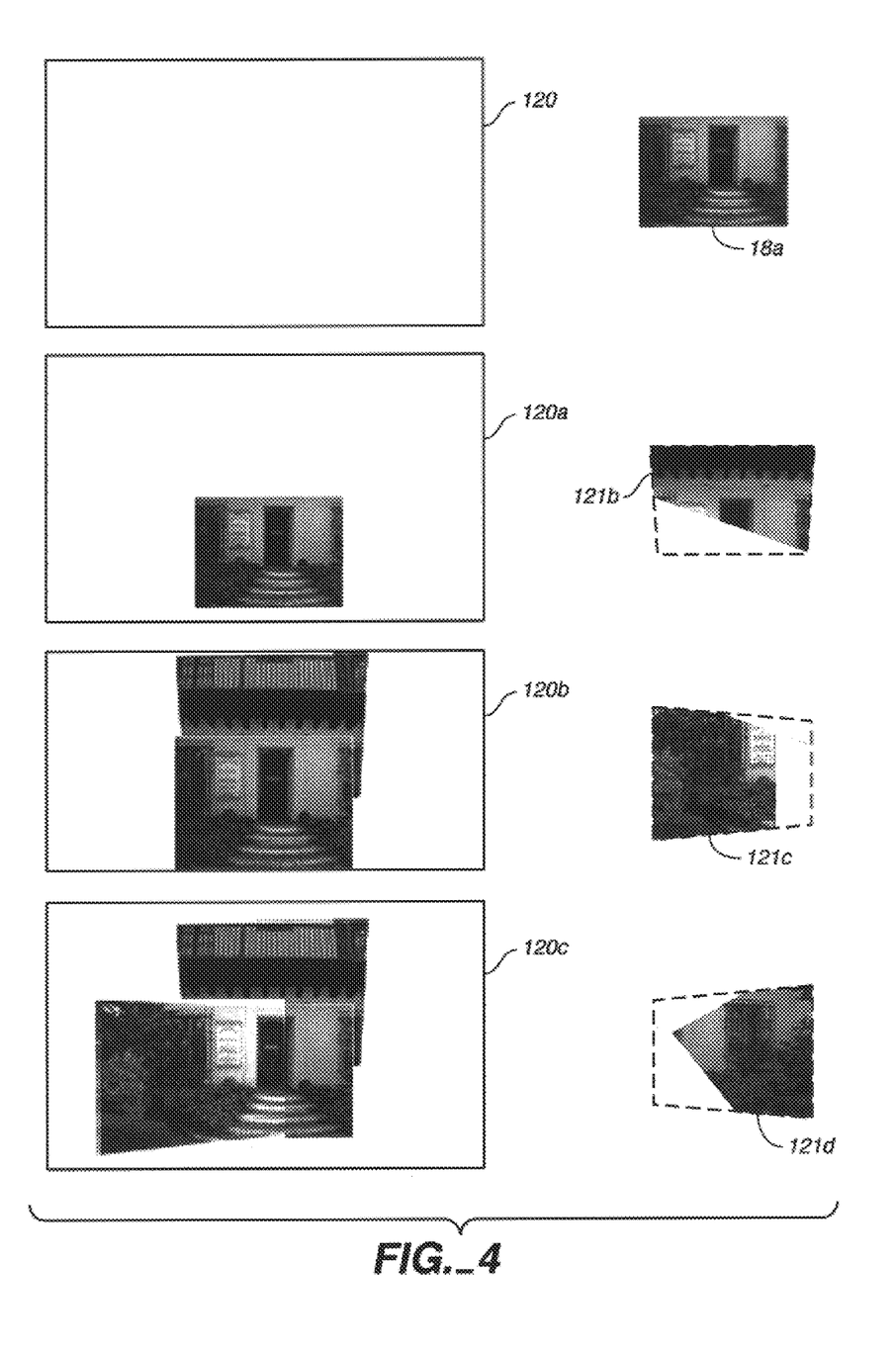
FIG. 4 shows various intermediate images drawn when creating the panoramic image.

Referring to FIG. 4, the image blender starts with a clean background, known as a canvas 120, onto which it draws the first image 18a to produce an image 120a, after which the image blender draws the visible portion 121b of the second image 18b' onto the canvas 120 to produce the image 120b. In drawing the second image, the image blender computes the pixel values of the image 120b according to the formula:

$$\text{Pixel}_{panoramic} = \text{pixel}_{second\ image} * \text{mask}_{13}\ \text{value} + \text{pixel}_{first\ image} * (1 - \text{mask\_value})$$

Where:

$\text{pixel}_{second\ image}$ is the value of a pixel of the second image;

$\text{pixel}_{first\ image}$ is the value of a pixel of the first image that is at the same position as the pixel of the second image; and mask value is the value of the mask of the pixel of the second image.

As can be seen from the formula above, where the pixel value of the second image has a value of "1", the second image completely obstructs the first image and where the pixel value of the second image has a value of "0", the first image is completely visible through the second image. However, when the mask value is between "0" and "1", the image blender mixes the first and the second image, thereby smoothing the transition from one image to another.

After drawing the second image, the image blender draws the visible portion 121c of the image 18c' to produce the image 120c. Finally, the image blender draws the visible portion 121d of the image 18d' to produce the panoramic image 26 of FIG. 2B.

From the discussion above, it should be clear that the mask values of each image only depend on the images before it. Consequently, the mask value of an earlier image does not need to be recomputed when a newer image is removed or added. This saves on computing time, resulting in a shorter response time. For example, when a user commands the stitching software 14 to add a new image, the stitching software computes the mask of the new image relative to the four images 18a, 18b'–18d'. The stitching software then draws the visible portion of the new image over the canvas 120, thereby obstructing a portion of at least one of the previously drawn images 16a, 18b'–18d'. If the user later commands the software to remove the new image, the stitching software erases the canvas 120 and draws the visible portions of the 18a, 18b'–18d' images in sequence based on the previously computed image masks, as previously described.

A number of embodiments of the invention have been described. Nevertheless, it will be understood that various modifications may be made without departing from the spirit and scope of the invention. For example, the image 18 to be blended may be obtained form a digital camera, storage 16, or a network 26. The positioning module may determine the relative positions of segments depicted in two images by prompting the user to use the pointing device 24 to click on an object, such as the top left corner of the doorway, that is depicted in both of the images and determining the relative positions based on the positions that the user clicks on.

Accordingly, other embodiments are within the scope of the following claims.

What is claimed is:

1. A method for merging images, comprising:

receiving images, each image representing a segment of a view;

receiving position information specifying positions of the images relative to each other;

for each image and based on the position information, identifying all other images that overlap the image;

grouping the images into pairs, wherein an image is grouped into a pair with each image identified as overlapping the image;

defining a transition band for each pair of images;

for each image in a pair of images, assigning a masking value for each pixel of the image, wherein the masking values specify complete visibility for each pixel in an area of the image that does not overlap the other image of the pair, the masking values specify partial visibility for pixels in the transition band, and the masking values specify complete invisibility for the remainder of the pixels in the image; and merging the images using the calculated masking values.

2. The method of claim 1 wherein each image has an outline and defining a transition band for a pair of images further includes:

calculating intersection points between the outlines of images in the pair of images; and calculating the longest line segment defined by the intersection points.

3. The method of claim 2, wherein:

defining a transition band further includes defining a region of pixels adjacent to the longest line segment as the transition band; and for an image, assigning masking values to pixels in the transition band includes defining a gradient of masking values such that masking values transition smoothly from values specifying complete visibility at one edge of the transition band to values specifying complete invisibility at another edge of the transition band.

4. The method of claim 3, wherein:

specifying complete visibility includes setting a masking value of 1; and specifying complete invisibility includes setting a masking value of 0.

5. The method of claim 1, wherein the receiving images includes:

receiving images representing segments that are arranged in an arbitrary arrangement.

6. The method of claim 1, wherein receiving position information includes:

determining a position of a first image relative to a second image.

7. The method of claim 6, wherein determining the position of an image includes:

selecting an item that is shown in the first and second images;

selecting a reference point in the first image; and calculating horizontal and vertical displacement between the item and the reference point.

8. The method of claim 1, further comprising:

cumulatively updating the masking values for each pixel of an image.

9. The method of claim 1, wherein merging the images includes:

correcting a perspective of an image.

10. A computer program product, tangibly stored on a machine-readable medium, for merging images, comprising instructions operable to cause a programmable processor to:

receive images, each image representing a segment of a view;

receive position information specifying positions of the images relative to each other;

for each image and based on the position information, identify all other images that overlap the image;

group the images into pairs, wherein an image is grouped into a pair with each image identified as overlapping the image;

define a transition band for each pair of images;

for each image in a pair of images, assign a masking value for each pixel of the image, wherein the masking values specify complete visibility for each pixel in an area of the image that does not overlap the other image of the pair, the masking values specify partial visibility for pixels in the transition band, and the masking values specify complete invisibility for the remainder of the pixels in the image; and merge the images using the calculated masking values.

11. The computer program product of claim 10, wherein each image has an outline and instructions to define a transition band for a pair of images further include instructions to:

calculate intersection points between the outlines of images in the pair of images; and calculate the longest line segment defined by the intersection points.

12. The computer program product of claim 11, wherein:

instructions to define a transition band further include instructions to define a region of pixels adjacent to the longest line segment as the transition band; and instructions to assign masking values to pixels in the transition band include instructions to define a gradient of masking values such that masking values transition smoothly from values specifying complete visibility at one edge of the transition band to values specifying complete invisibility at another edge of the transition band.

13. The computer program product of claim 12, wherein:

instructions to specify complete visibility include instructions to set a masking value of 1; and instructions to specify complete invisibility include instructions to set a masking value of 0.

14. The computer program product of claim 10, wherein the instructions to receive images include instructions to:

receive images representing segments that are arranged in an arbitrary arrangement.

15. The computer program product of claim 10, wherein instructions to receive position information include instructions to:

determine a position of a first image relative to a second image.

16. The computer program product of claim 15, wherein instructions to determine the position of an image include instructions to:

select an item that is shown in the first and second images;

select a reference point in the first image; and calculate horizontal and vertical displacement between the item and the reference point.

17. The computer program product of claim 10, further comprising instructions to:

cumulatively update the masking values for each pixel of an image.

18. The computer program product of claim 10, wherein instructions to merge the images include instructions to:

correct a perspective of an image.

* * * * *